UNITED STATES PATENT OFFICE.

DUBOIS D. PARMELEE, OF NEW YORK, N. Y., ASSIGNOR TO CHARLES L. RICHARDS, OF SAME PLACE.

IMPROVEMENT IN THE MANUFACTURE OF HARD RUBBER OR VULCANITE.

Specification forming part of Letters Patent No. 48,992, dated July 25, 1865.

*To all whom it may concern:*

Be it known that I, DUBOIS D. PARMELEE, of New York, in the county and State of New York, have invented certain new and useful Improvements in Treating India-Rubber, Gutta-Percha, or other Vulcanizable Gums, either separate or combined, for the purpose of converting these gums into hard, or hard and flexible, or hard and elastic, substance resembling ivory, horn, whalebone, &c., resembling vulcanite, and which will supply the place of these products in their application to a great many useful purposes for which they are generally used; and I hereby declare that the following is a full, clear, and exact description of my said improvement.

To enable others to make and use the same, I will now proceed to describe the manner in which the same is or may be carried into effect.

I take, say, ten pounds of any of the vulcanizable gums—for instance, the gum known as Para india-rubber, in bottles, as imported and found in commerce—and pass it through mullers or masticators, such as are commonly employed by india-rubber manufacturers, until the gum is attenuated or reduced to a thin sheet. This sheet is placed in a drying-room of a temperature of 100° to 150° for about one week, or until the moisture always contained in gum of commerce is driven out. The rubber sheet is then taken and ground in or masticated thoroughly with about one pound of flour of sulphur, and the compound is passed through ordinary colanders or spreaders and formed into a sheet of desired thickness. The sheet thus made may be made into tubes, cut into small tablets, or fashioned into such forms as may be required, all by the ordinary mechanical appliances as well understood by artisans or the operatives of india-rubber works. Tubes, tablets, or such other forms as may have been fashioned from the rubber compound are next subjected to a heat of from 260° to 270° Fahrenheit, until the change constituting vulcanization according to the process of the deceased Charles Goodyear has been effected. The rubber is then removed from the heaters and well dried again.

So far the process described involves no novelty, nor is the result or product obtained at this stage of operation anything else than the soft and elastic vulcanized rubber of Chas. Goodyear.

For the purposes of my invention I take the rubber prepared, as before described, or rubber prepared substantially in accordance with the invention of Chas. Goodyear, deceased, and for which Letters Patent were issued to him on the 15th day of June, 1844, and immerse the same in a solution of chloride of sulphur dissolved in bisulphide of carbon or other solvent of caoutchouc. I prefer to use about one and a half part of the protochloride of sulphur in one hundred parts of the bisulphide of carbon, and maintain the india-rubber article or sheets in said solution for about three hours, when they are taken out and immersed in a stronger solution of, say, two and a half parts of protochloride of sulphur dissolved in one hundred parts of bisulphide of carbon. In this stronger solution the india-rubber articles are allowed to remain until the required hardness has been attained, which varies according to the thickness and size of the article, the nature of the gum, and the degree of elasticity sought to be attained. As a general thing and for ordinary-sized articles the desired effect is produced in about three hours. I have found that by graduating the strength of the solution—that is, by gradually raising the proportion of the chloride of sulphur—a more flexible and elastic compound is produced. After the rubber is sufficiently hardened it is removed from the solution and exposed to the atmosphere at the ordinary temperature for a few hours, after which the surfaces are cleaned or ground to remove the thin coating of sulphurous matter generally collected on the surface thereof. After further exposure to warm air for the purpose of volatilizing the bisulphide of carbon the articles may be highly polished by the same means and process employed for polishing ivory or hard rubber articles.

I would observe that I am aware that india-rubber has been converted into a hard, flexible, and elastic substance, and that Letters Patent for the product and the method of producing the same by combining india-rubber with sulphur in certain proportions and subjecting the same to a high degree of heat have been issued to H. B. Goodyear, administrator of Nelson Goodyear, deceased.

I am also aware that by means of chloride of sulphur and bisulphide of carbon india-rubber has heretofore been converted into a hard substance, which process was, however, of no avail in the art, because of the expansion, warping, and cracking of the rubber while undergoing the process of hardening; also, because the rubber thus hardened is extremely brittle and void of flexibility or elasticty.

Having thus described my said invention and the manner in which the same is or may be carried into effect, I claim—

The method herein described of producing hard rubber, or hard and flexible rubber, or hard, flexible, and elastic rubber, by subjecting native rubber first to the vulcanizing process according to the invention patented by Chas. Goodyear, deceased, on the 15th day of June, 1844, and by then immersing the vulcanized rubber thus obtained in chloride of sulphur dissolved in bisulphide of carbon or other fit solvent of caoutchouc, substantially as set forth.

In testimony whereof I have signed my name to this specification before two subscribing witnesses.

DUBOIS D. PARMELEE.

Witnesses:
EDM. F. BROWN,
JOS. L. COOMBS.